United States Patent [19]
Westerlund

[11] Patent Number: 6,073,516
[45] Date of Patent: Jun. 13, 2000

[54] MULTI-FUNCTION CAM FOR A PACKAGING MACHINE

[75] Inventor: Shawn Westerlund, Aitkin, Minn.

[73] Assignee: Riverwood International Corporation, Atlanta, Ga.

[21] Appl. No.: 09/076,140

[22] Filed: May 11, 1998

[51] Int. Cl.[7] .................................................. F16H 53/06
[52] U.S. Cl. ............................................... 74/569; 74/569
[58] Field of Search .................................. 74/36, 49, 53, 74/567, 569, 592, 526, 813 L, 813 R, 813 C

[56] References Cited

U.S. PATENT DOCUMENTS

| | | | |
|---|---|---|---|
| 3,585,837 | 6/1971 | Bihler | 74/53 X |
| 3,811,330 | 5/1974 | Weichhand et al. | 74/53 |
| 5,337,623 | 8/1994 | Huang et al. | 74/813 R |
| 5,357,827 | 10/1994 | Natwick et al. | 74/569 |
| 5,724,861 | 3/1998 | Mang | 74/567 |
| 5,765,448 | 6/1998 | Martelli | 74/526 |
| 5,813,281 | 9/1998 | Yoshida et al. | 74/53 X |

*Primary Examiner*—Vinh Luong
*Attorney, Agent, or Firm*—Skinner and Associates; Steve McLary

[57] ABSTRACT

A multi-functional cam system for controlling movement of a portion of a machine performing repetitive operations. A cam has a contour designed to control at least two different sequences of motion for a mechanism driven by the cam. The desired sequence of motion is obtained by registering the cam on its shaft to the position corresponding with that sequence of motion, then locking the position of the cam relative to the shaft. The mechanism that attaches the cam to the shaft includes a two-part hub, the two parts being axially clampable, a sleeve attached to the cam, the sleeve having a portion that is clamped between the hub parts, and a radially expandable locking device operating between the first hub part and the shaft. The clocking mechanism includes a sleeve tab extending axially from the sleeve, and at least two hub tabs extending radially from the first hub part. The sleeve tab and the hub tabs are designed and arranged to interfere with rotation of the sleeve relative to the first hub part and to locate one of the hub tabs adjacent the sleeve tab for each of the positions of the cam relative to the shaft.

11 Claims, 8 Drawing Sheets

MULTI-FUNCTION CAM FOR A PACKAGING MACHINE

BACKGROUND OF THE INVENTION

1. Field of the Invention

The present invention relates, generally, to mechanisms for controlling machines, and more particularly to a cam mechanism for controlling a packaging machine.

2. Background Information

Machines that perform repetitive tasks are often controlled by at least one mechanical cam and follower mechanism. Each axis of motion may have a separate cam and follower mechanism. The follower is connected to a mechanical linkage which is connected to some mechanism or device that performs the desired function. As the cam rotates, the follower moves over a contoured surface or edge of the cam. As the follower moves, it drives the linkage and the connected mechanism or device through a specific pattern of motion to accomplish the desired function. Motions of multiple mechanisms are synchronized by synchronizing the relative motion of multiple cams by mechanical drive means.

Any particular machine may be able to produce a variety of related products by changing the set-up of the machine. Such a set up change requires changing the cam(s). This means disconnecting the follower mechanism from the cam, physically removing the cam (which may be a rather large heavy metal plate), installing the new cam, and reconnecting the follower mechanism. Cams are usually located inside a machine and they may be difficult to access, which further complicates changing the cam.

Alternatives to mechanical cams include optical cams and computer control. Optical cams have an optical sensor which tracks a line of sharp contrast on a rotating drum. The position of the optical sensor is related to the physical position of a mechanism on the machine being controlled by the cam. The line of sharp contrast is typically formed by a contoured sheet of black mylar or other similar material attached to a white drum. While a variety of mylar cams are easier to handle and store than metal cams, each change of product still requires changing the mylar cam.

Computer control uses numeric data to control drive motors which in turn control the mechanisms in the machine. The "flight path" of each axis of motion must be programmed, and the relative motion of all axes synchronized, typically by time or by position of one axis. While programming the machine for the first product may be complicated, subsequent variations may be more easily programmed by changing a few parameters. Many programs are easily stored in the computer memory or on a computer disk. Changing the set-up simply requires reloading the program into the computer that controls the machine.

Computer control offers the most flexibility, but is also the most expensive. It is very useful where a machine must be able to perform a large variety of very complicated operations, such as on a milling machine for making three-dimensional shapes. Optical cam control may be less expensive but is less flexible than computer control. It is useful where a machine may perform many variations of the same basic movement such as on a filament winding machine that winds fiberglass filaments onto a variety of mandrels in a variety of patterns.

For machines that perform a simple repetitive operation with only a few variations, mechanical control using mechanical cams is still a very efficient and cost effective. It would, however, be more efficient and cost effective if one cam could be used on more than one product or operation without having to completely remove and change the cam. Applicant's invention provides a mechanical cam which can be used for two related operations by loosening and rotating the cam approximately 170 degrees and retightening it rather than removing it and replacing it.

BRIEF SUMMARY OF THE INVENTION

The present invention provides a multi-functional cam system for controlling movement of a portion of a machine performing repetitive operations. A significant feature of the invention is a cam designed to control at least two different sequences of motion for a mechanism driven by the cam. The desired sequence of motion is obtained by clocking the cam on its shaft to the position corresponding with that sequence of motion, then locking the position of the cam relative to the shaft.

The preferred embodiment of the cam is a flat plate assembled from at least two sections onto a rotatable shaft so that the plate's axis of rotation aligns with that of the shaft. The plate has a first face with a groove in it which receives a follower. The groove forms a closed curve around the axis of rotation and has a varying radius from the axis of rotation. One portion of the groove causes the first motion sequence of the mechanism controlled by the cam. The groove has at least one other portion which causes at least one other motion sequence of the mechanism controlled by the cam. The cam has a plurality of clocked positions relative to the shaft. One of the clocked positions corresponds to the first motion sequence of the mechanism. Other clocked positions correspond to other motion sequences of the mechanism controlled by said cam.

To attach the cam to the shaft, a clamping hub mechanism is used in conjunction with a radially expandable locking device. The preferred embodiment includes a radially expandable locking device, a sleeve, a first hub and a second hub, all disposed coaxially with said shaft. The expandable locking device is disposed radially between the first hub and the shaft. The locking device has a locked state which securely holds the first hub in a fixed position relative to the shaft. It also has a loosened state which allows the first hub to be rotated relative to the shaft. The cam is axially offset from the first hub and the expandable locking device. The second hub is located axially between the cam and the first hub. The first and the second hubs are clampable axially by bolts connecting them. The sleeve is disposed generally radially outward from the second hub, and is mechanically fastened to the cam. The sleeve has a bore with a portion which receives the second hub in sliding engagement. The sleeve also has an inwardly extending portion disposed between the first and the second hubs. When the hub clamping bolts are tightened, the inwardly extending portion of the sleeve is clamped between the first and the second hubs, thereby fixedly connecting the first hub to the cam.

The mechanism used to clock the cam on the shaft includes a sleeve tab extending axially from the sleeve, and at least two hub tabs extending radially from the first hub. Each of the hub tabs is for each of the positions of the cam relative to the shaft. The sleeve tab and the hub tabs are designed and arranged to interfere with rotation of the sleeve relative to the first hub and to locate one of the hub tabs adjacent the sleeve tab for each of the positions of the cam relative to the shaft. Each of the hub tabs may also have a stop bolt arranged so as to hit the sleeve tab when the hub tab is adjacent the sleeve tab, thereby providing adjustment of the positions of the cam relative to the shaft.

A cam follower is connected to the mechanism controlled by the cam. In the preferred embodiment, it is a bearing which is received in the groove and tracks in the groove as the cam rotates.

The features, benefits and objects of this invention will become clear to those skilled in the art by reference to the following description, claims and drawings.

DETAILED DESCRIPTION

Paperboard cartons or containers are an important packaging vehicle for vegetable and fruit producers worldwide. Tray-style paperboard containers are an especially important packaging option for growers of strawberries, blueberries, raspberries, cherries, tomatoes and peaches because they function as on-site initial packaging means, shipment means and as retail packaging means. The containers are sturdy, stable when wet, stackable and are not fully enclosed to permit filling, contents inspection, and ventilation. This type of container also provides improved external panel spaces for high quality graphics printing and advertising.

Such a container and a machine for producing it is described in U.S. Pat. No. 5,656,007, entitled Apparatus For Constructing Multi-Piece Cartons, issued Aug. 12, 1997, said patent being assigned to Riverwood International Corporation, the assignee of this application. The above patent is hereby incorporated by reference.

Figure 1:
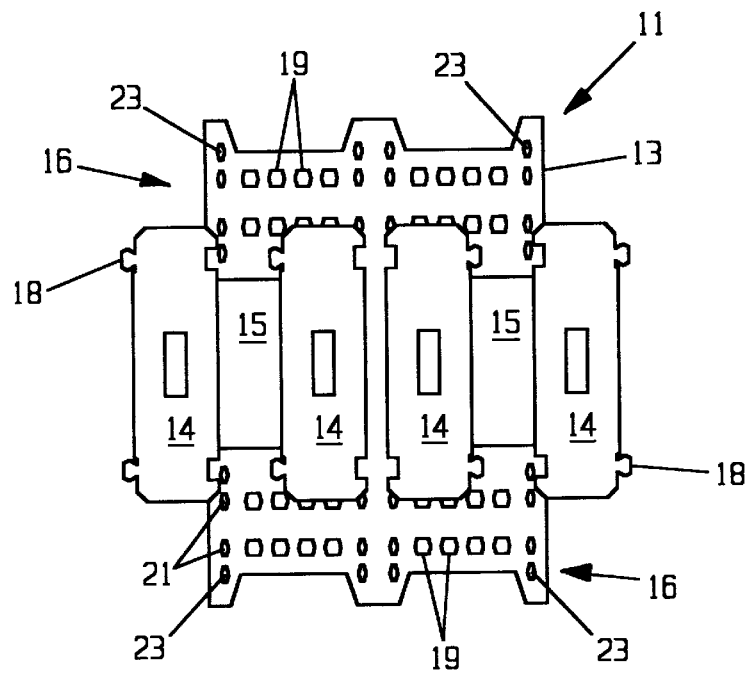
FIG. 1 is a plan view of a carton blank.
Figure 2:
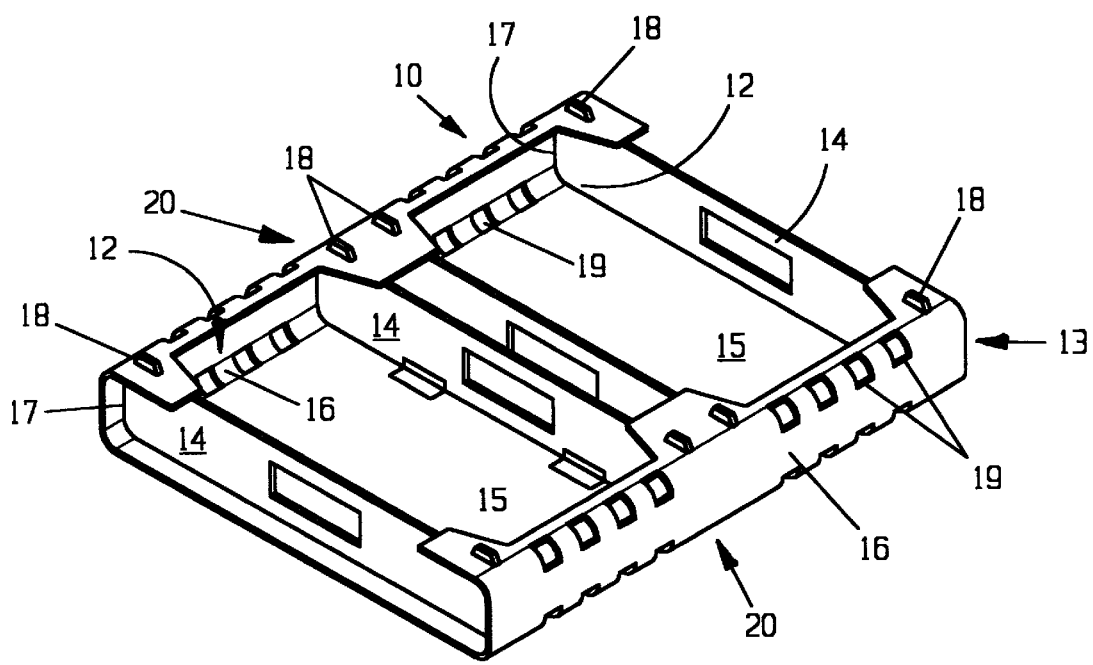
FIG. 2 is a perspective view of an erected carton made from the blank of FIG. 1.

Referring to FIGS. 1 and 2, a typical tray style carton 10 is shown erected from preform 11. The erected carton 10 is rectangular, somewhat flat, open at its top and has a pair of compartments 12. The carton 10 comprises a relatively wide wrap member 13 and a plurality of web or panel members 14. A carton may have four web panel members 14 as shown with the two middle webs 14 separating the compartments 12, or a carton may have a single web 14 separating the compartments 12, or a carton may have a single compartment 12 with only two web panel members 14, one on each end. Other embodiments of the subject containers are disclosed in U.S. Pat. Nos. 5,116,290 and 5,316,207, assigned to applicant's assignee. Each wrap 13 has a flat base 15 with foldable members 16 which fold up and over short edges 17 of web panel members 14 and can interlock with top tabs 18 on web panel members 14. Apertures 21 receive bottom corners of web panels 14 and apertures 23 receive top tabs 18 when carton 10 is folded to a full lock position. A plurality of apertures 19 are located at top and bottom edges 20 which provide for ventilation and drainage of the contents of the carton.

Figure 3:
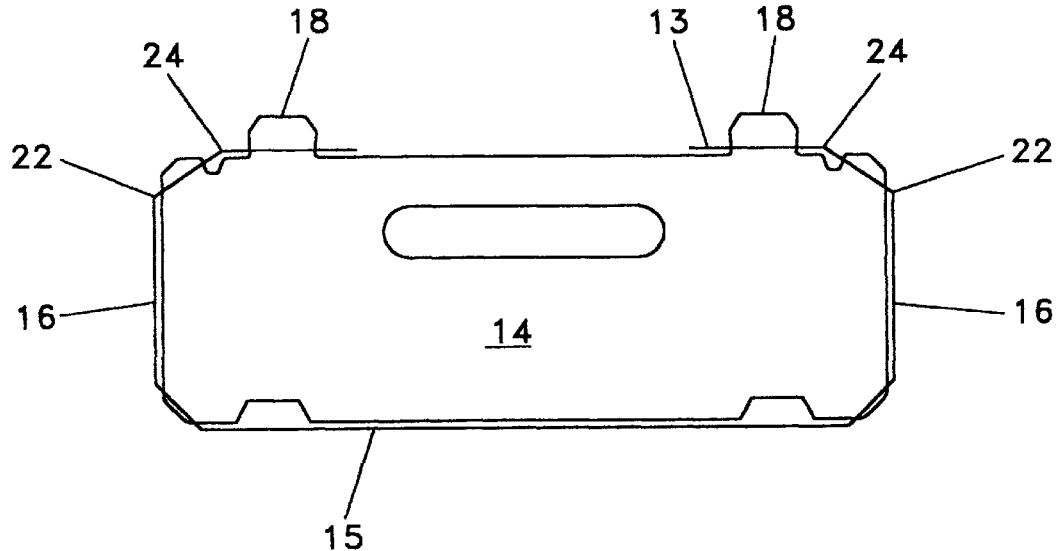
FIG. 3 is an end view of the erected carton of FIG. 3 in a fully locked condition.
Figure 4:
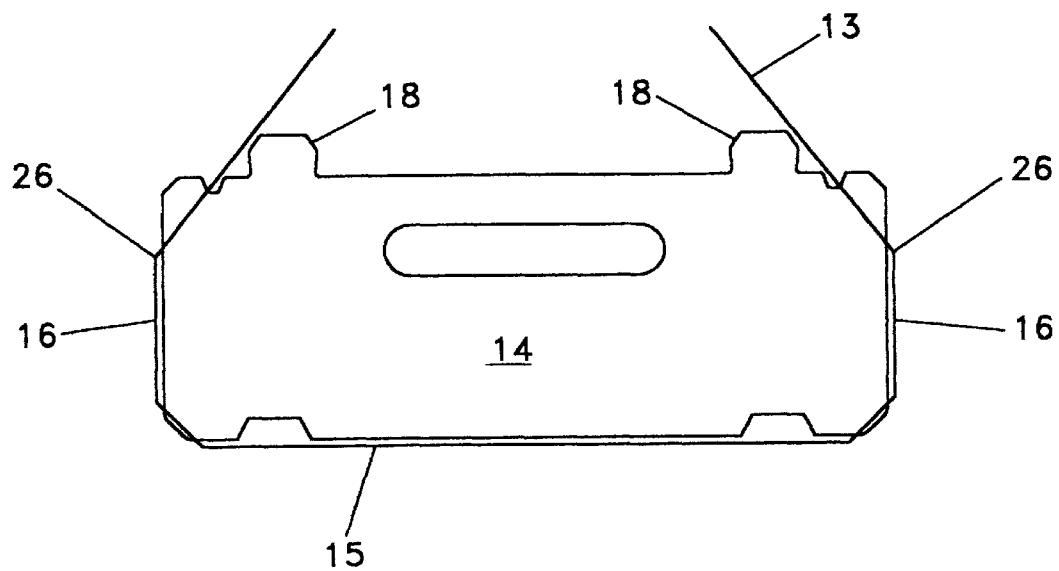
FIG. 4 is an end view of the erected carton of FIG. 3 in a shoulder locked condition.

Referring to FIGS. 3 and 4, the wrap 13 may be folded into a full lock position as shown in FIGS. 1 and 3, or a shoulder lock position as shown in FIG. 4. In a full lock position, foldable members 16 fold at locations 22 and 24 and top tabs 18 engage wrap 13 and lock it in place. In a shoulder lock position foldable members 16 fold at location 26 and wrap 15 engages groove or shoulder 28 in web panel members 14. A carton formed with a shoulder lock configuration has a wider opening to facilitate filling. Once full, it may be fully locked by hand by pulling wrap 15 out of shoulder 28 and refolding it to engage tabs 18.

Cartons 10 may be formed in an erected configuration, either fully locked or shoulder locked, or they may be formed in their substantially flat pre-form state for erecting at the site of use.

Figure 5:
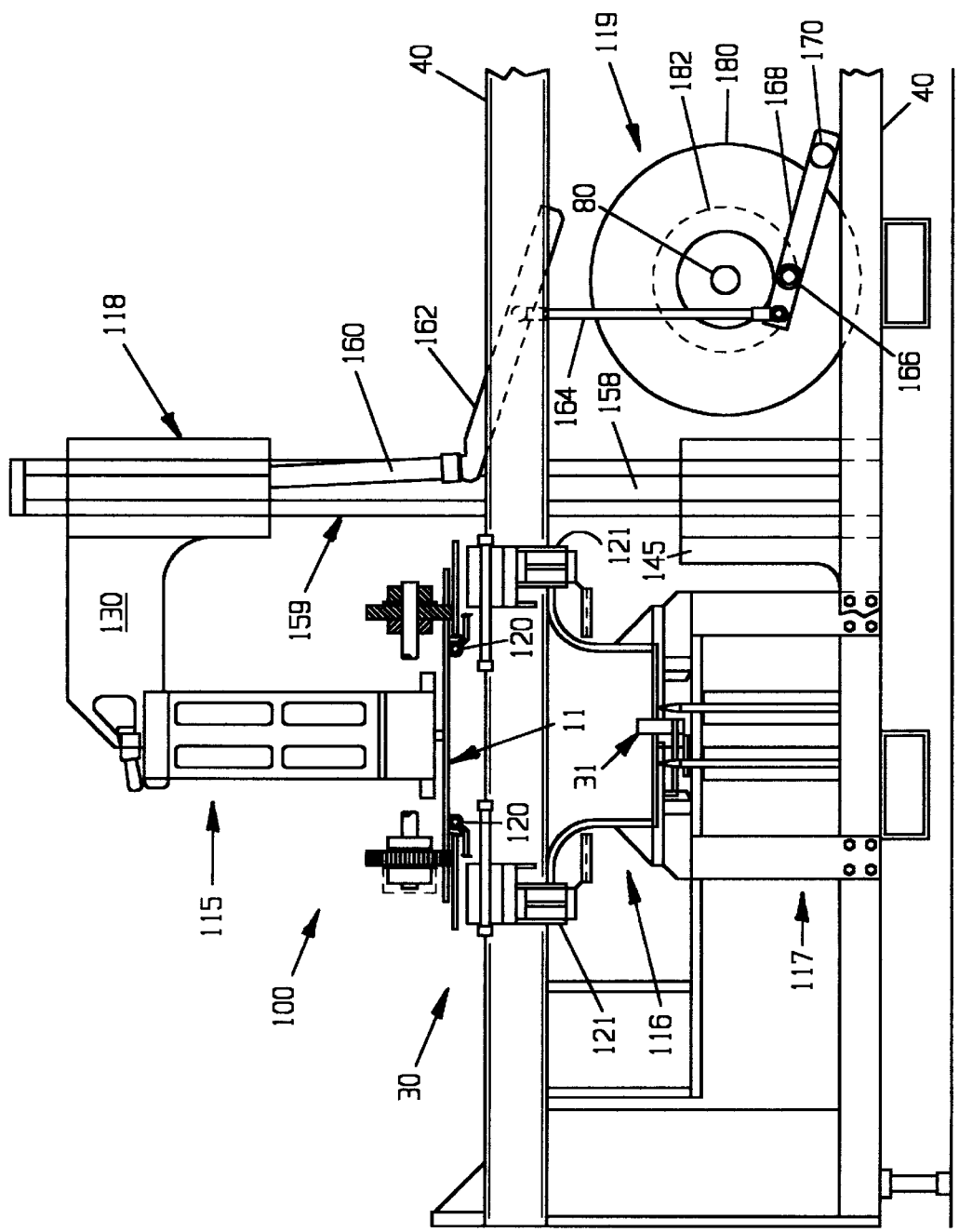
FIG. 5 is an elevation view of a portion of a machine used to produce cartons of FIG. 2 taken in-line with the final product flow.

Referring to FIG. 5, a machine 100 that forms cartons 10 can be run in a formed-carton mode so that the output of the machine is an erected carton in one of the forms shown in FIGS. 1–4, or machine 100 can be run in a preform mode so that the output is an unerected carton or preform which is substantially flat. When the machine is in the formed-carton mode rather than the pre-form mode, the preform is removed from a conveyor, erected into a carton at the forming station 30 and discharged by a discharge conveyor 31. The folding operation which erects the cartons 10 is controlled by a mechanical drive mechanism 119.

The forming station 30 basically comprises upper, middle and lower mandrels 115, 116 and 117, respectively, a vertical actuation carriage 118 to which the upper and lower mandrels 115 and 117 are attached, a drive mechanism 119 which powers the upper and lower mandrels 115 and 117 on the carriage 118, drop-away support rods 120 which are pivotally attached to the frame 40, and locking fingers 121. In operation, firstly a preform 11 is transported by a conveyor and aligned with the forming station 30. In this position, the preform 11 rests on the support rods 120 which are in a horizontal position. Secondly, the lower mandrel 117 moves up and mates with the middle mandrel 116. Thirdly, the upper mandrel 115 moves down, engages the preform 11 and drives it downwardly though the rods 120, which fall away, and into the mated middle and lower mandrels 116 and 117 which causes the preform to become substantially folded into a carton configuration. Fourthly, the locking fingers 121 move inwardly and engage predetermined portions of the preform 11 to lock them into place yielding a completed carton (not shown). After the carton is formed, the upper and lower mandrels and the locking fingers retract, and the carton is left in the stationary center mandrel and then carried out on the discharge chain. After each forming cycle, the forming station is reset whereby the upper mandrel 115 and the support rods 120 return to their initial positions. This process, including the timing of this process, is controlled by a properly clocked or registered mechanical drive mechanism 119.

The carriage 118 basically comprises a rigid vertically disposed frame 158 and a linkage assembly 159. The connection brackets 130 and 145 of the upper and lower mandrels 115 and 117 are slidably connected to the frame 158. The linkage assembly 159 connects each bracket 130 and 145 to the drive mechanism 119. A cylinder 160 further links the upper bracket 130 to the drive mechanism 119 through linkage members 162 and 164. The drive mechanism 119 comprises a rotating shaft 80 with a plurality of cams for controlling driven components. The plurality of cams include the cam 180 shown in FIG. 5 and the multi-functional cam 50 that is shown and illustrated in FIGS. 6–8 and is positioned behind cam 180 in FIG. 5. The cams 50 and 180 and the shaft 80 share an axis of rotation 200. The multi-functional cam 50 is the subject matter of the claimed cam system of the present invention. The cam shown, 180, controls the upper mandrel 115. Cam 180 has a groove 182 of varying radius which receives a cam follower 166 attached to linkage member 168 that is pivotably attached to frame 40 at pivot 170. As shaft 80 rotates cam 180, follower 166 moves vertically as the radius of groove 182 changes. This in turn moves linkage members 164 and 162 which moves mandrel 115. A similar cam and follower controls the lower mandrel 117 and another controls the locking fingers 121.

The upper and lower mandrels 115 and 117 move the same regardless of whether a formed carton is of the full lock or shoulder lock style, so the cams controlling them need not be changed when changing from a shoulder lock to a full lock style carton or vice versa. But the locking fingers 121 go through different motions depending on whether the formed carton is a shoulder lock style or a full lock style. Consequently, the cam on shaft 80 controlling locking fingers 121 must be changed when changing carton styles. It is that cam, cam 50 (not shown in FIG. 5), which is the subject of the present invention.

Shaft 80 with cam 50 attached is located inside machine 100 and is not readily removable. It would be difficult to remove and change cam 50 when changing configuration of cartons produced from full lock to shoulder lock of vice versa. The present invention allows the single cam 50 to control machine 100 to form cartons 10 in both the full lock configuration and the shoulder lock configuration simply by clocking cam 50 approximately 170 degrees on shaft 80.

Figure 6:
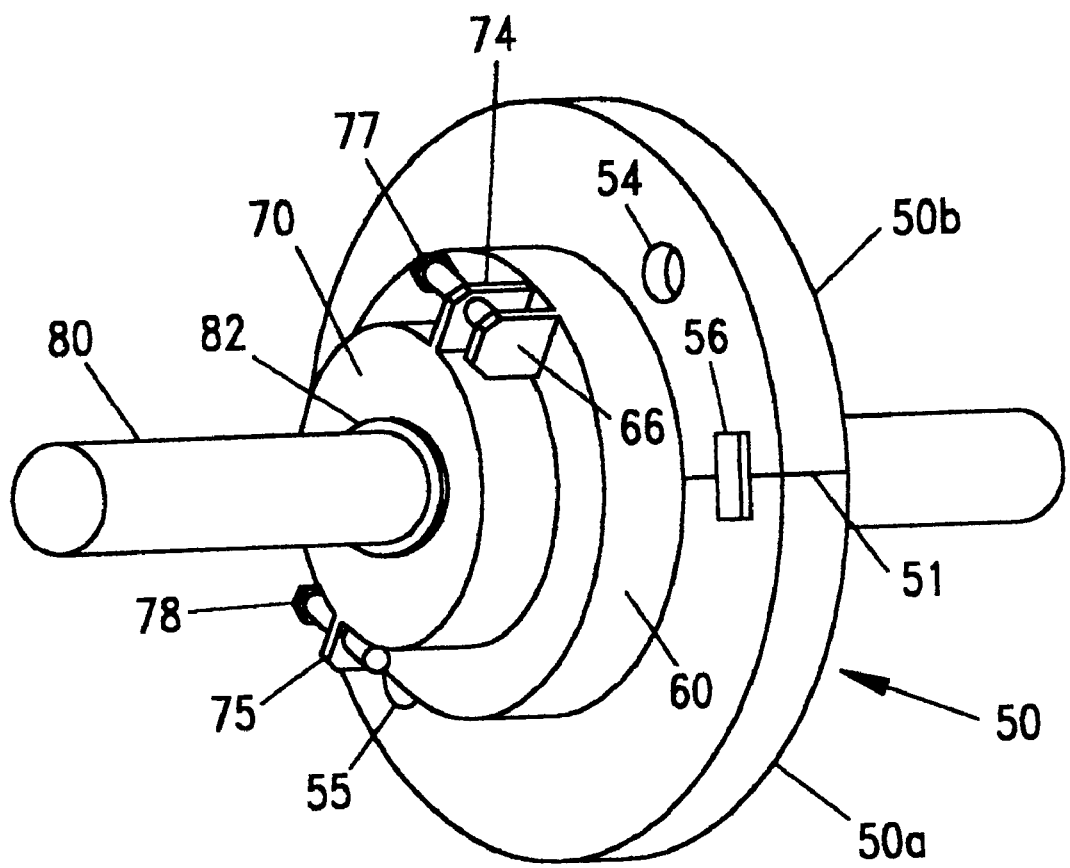
FIG. 6 is a perspective assembly view of a multi-function cam and hub assembly used on the machine of FIG. 5.
Figure 8:
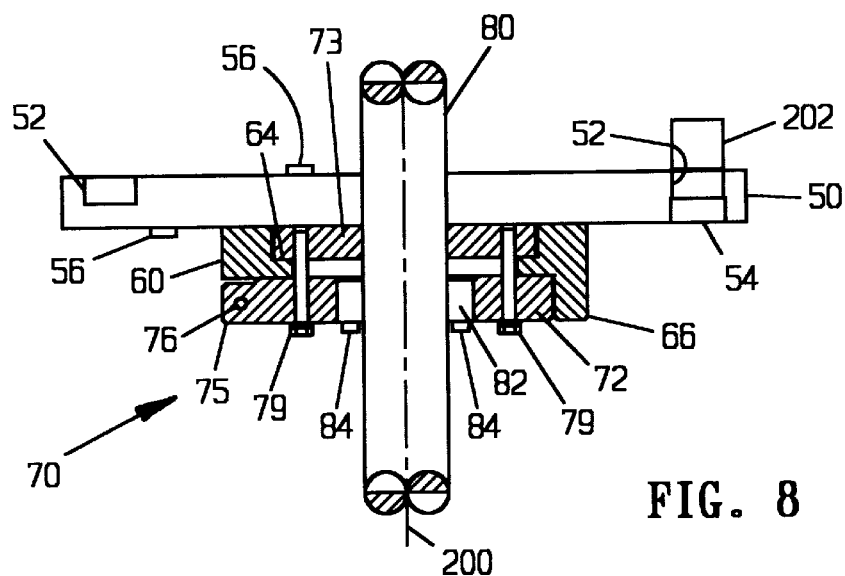
FIG. 8 is a sectional view taken along line 8—8 of FIG. 7.
Figure 7:
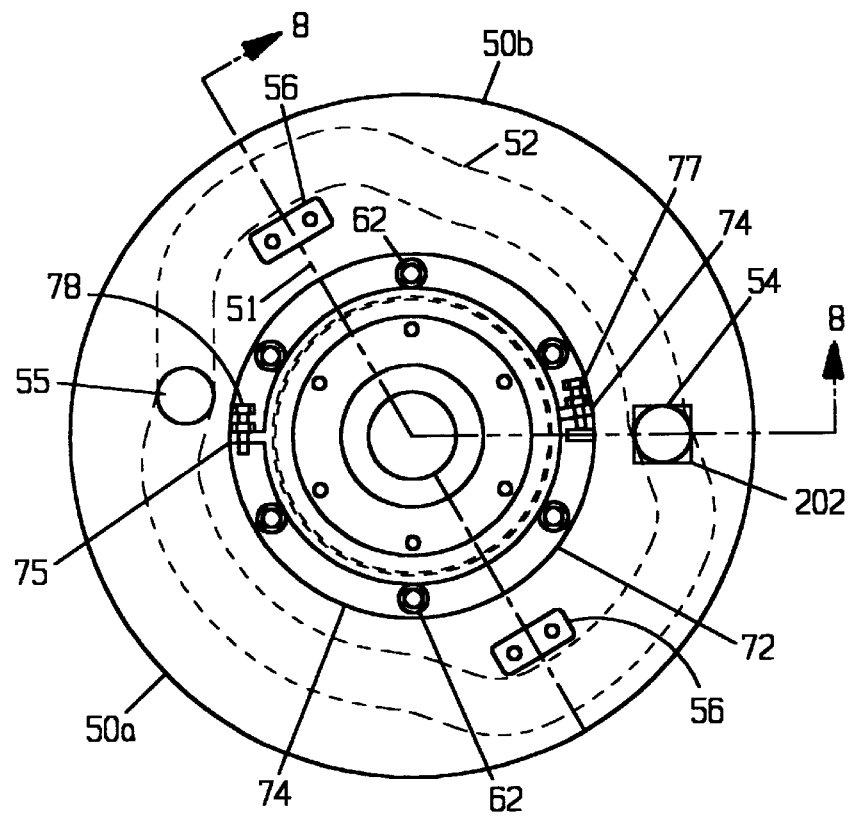
FIG. 7 is an end view of the assembly of FIG. 6.
Figure 9:
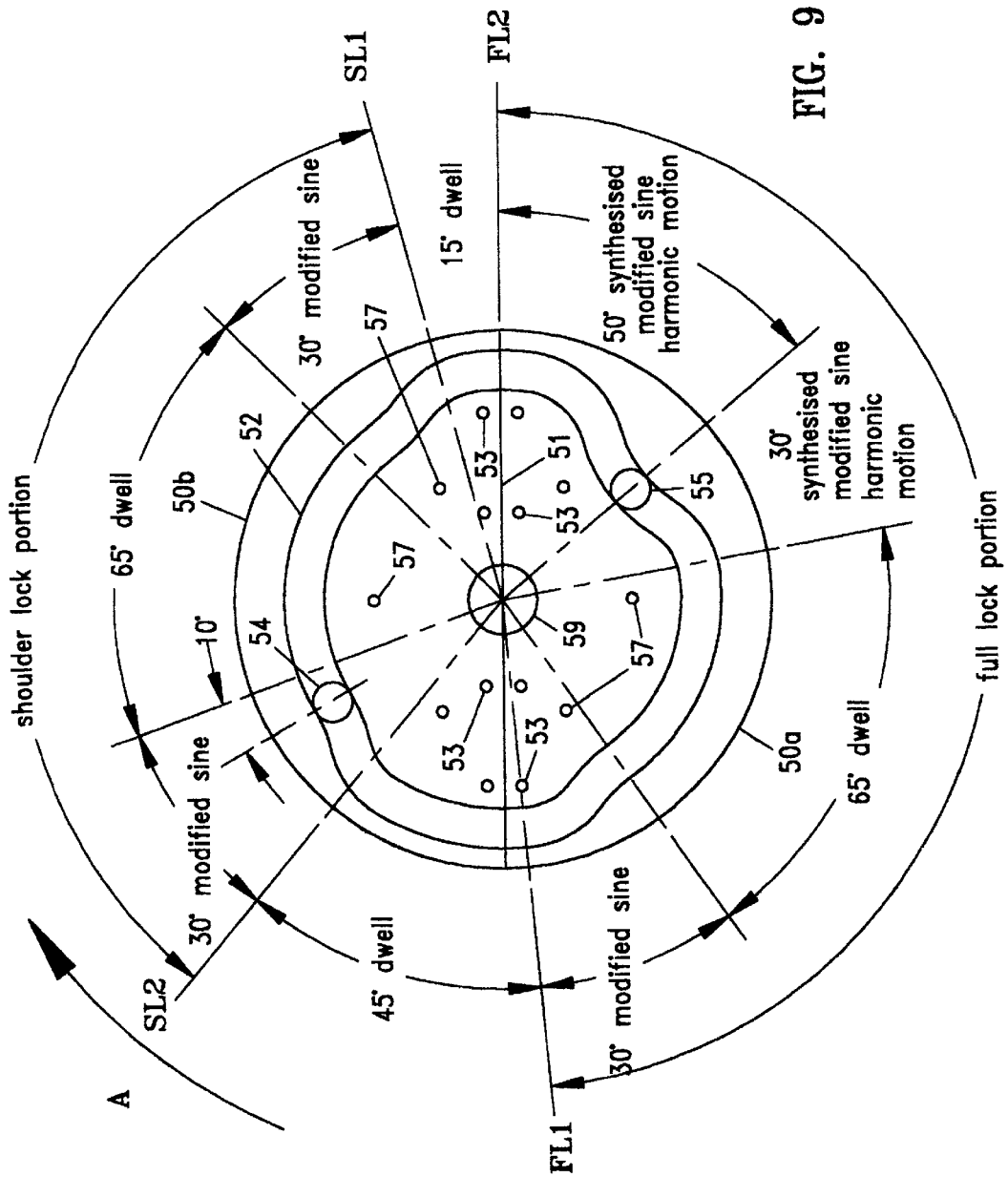
FIG. 9 is a rear view of the cam portions.

The claimed cam system of the present invention is illustrated in FIGS. 6–8. The multi-functional cam 50 is a curvilinear, and preferably a circular, plate made in a number of sections, preferably two 180 degree sections 50a and 50b, joined together at split line 51 by a plurality of tie bars 56, preferably two on each side of cam 50, which are mechanically fastened to each plate section. Making cam 50 in at least two sections allows cam 50 to be installed or removed from shaft 80 without having to remove shaft 80 from its mounting in the machine. Cam 50 has two apertures 54 and 55 aligned with groove 52 through which a cam follower 202, shown with respect to aperture 54 in a first registered position, can be seen to aid in proper clocking alignment or registration of cam 50 on shaft 80. Referring particularly to FIGS. 7 and 9, it is noted that the cam follower 202 generally remains in the position shown along the horizontal portion of the section line 8—8. As the cam 50 rotates, the cam follower 202 travels or tracks in the groove 52. As the cam follower 202 travels from SL1 to SL2, the cam follower 202 is influenced into a first motion sequence, i.e. the motion for the shoulder lock style carton in the packaging machine example. As the cam follower 202 travels from FL1 to FL2, the cam follower 202 is influenced into a second motion sequence, i.e. the motion for the full-lock style carton in the packaging machine example. The cam follower 202 is in a first registered position when it aligns with the aperture 54, and is in a second registered position when it aligns with the aperture 55. The registration of the cam 80 is described in more detail below. Cam 50 is attached to shaft 80 by sleeve 60, hub assembly 70, and expandable locking device 82.

Hub assembly 70 has two annular sections: a first section 72, and a second section 73 disposed axially from first section 72. First section 72 has two tabs 74 and 75, each of which receive a stop bolt 77 and 78 respectively in a threaded aperture 76. Tabs 74 and 75 extend radially from portion 72 and are located at specific circumferential locations on portion 72 approximately 170 degrees apart. Machine screws 79 pass through first section 72 and threadably engage second section 73 to make hub assembly 70 a clamping device.

Sleeve 60 is mechanically fastened to cam 50, preferably by machine screws 62 which pass through sleeve 60 and threadably engage cam 50. Sleeve 60 is disposed radially from second portion 73 of hub assembly 70 and has an inner diameter sufficient to provide adequate clearance for portion 73 to slidably rotate inside sleeve 60 but does not allow excessive radial play. Sleeve 60 has an inner annular portion 64 disposed between portions 72 and 73 and extending inward so that portion 64 is clamped between sections 72 and 73 of hub assembly 70 when screws 79 are tightened. Sleeve 60 also has a tab 66 which extends laterally from sleeve 60 and is located radially beyond portion 72 of hub assembly 70, except that as sleeve 60 is rotated with respect to hub assembly 70, tab 66 will contact stop bolts 77 and 78 located in tab 74 and tab 75 respectively.

Expandable locking device 82 is disposed radially between shaft 80 and first portion 72 of hub assembly 70. Expandable locking device is preferably a device such as a Tsubaki power lock, part number PL050x80 available from U.S. Tsubaki Inc., 301 East Marquardt Drive, Wheeling, Ill. 60090. It has a plurality of bolts 84 which, when tightened, cause the device 82 to expand radially, and when loosened, cause the device 82 to retract radially.

To install and align cam 50 on shaft 80, the mechanisms controlled by cam 50 must be in a "cycle stop" position, i.e. both the mechanism controlled by the cam 50 and the shaft 80 are in known positions so that the cam 50 can be properly registered to the shaft 80 by rotating a loosened or unlocked cam 50 to the desired angular position with respect to shaft 80 and then tightening or locking the cam 50 to the shaft 80. The following elements and description of the changeover between forming the shoulder lock and the full lock style cartons illustrate a means for registering the cam 50 with respect to the shaft 80. With hub assembly 70, sleeve 60 and cam 50 assembled and properly axially located on shaft 80 with expandable locking device 82, stop bolt 77 is set to a desired length in tab 74 and sleeve 60 rotated until tab 66 contacts stop bolt 77 as shown in FIG. 7, and screws 79 are tightened to clamp portion 64 of sleeve 60 tightly between portions 72 and 73 of hub assembly 70. Cam 50, sleeve 60 and hub assembly 70 are then rotated as a unit on locking device 82 until aperture 54 in cam 50 aligns with the cam follower 202 running in groove 52. Bolts 84 on expandable locking device 82 are then tightened to lock device 82 and the assembled hub assembly 70, sleeve 60 and cam 50 in position on shaft 80. In this set up, cam 50 will execute the proper operations to produce a shoulder lock configuration carton.

For change over to a full-lock style carton, screws 79 clamping hub portions 72 and 73 together are loosened and cam 50 with sleeve 60 attached is rotated approximately 170 degrees until aperture 55 in cam 50 aligns with the cam follower 202, at which point stop bolt 78 in tab 75 will be near tab 66. Stop bolt 78 is adjusted and screws 79 are tightened.

Subsequent changing of cam 50 between shoulder lock and full lock style cartons is accomplished simply by loosening screws 79 and rotating cam 50 with sleeve 60 until the opposite stop bolt 77 or 78 hits tab 66, then retightening screws 79.

Referring to FIG. 9, the back side of cam 50 with groove 52 is shown. The two halves 50a and 50b are joined at split line 51 and form center aperture 59 which receives shaft 80. The material for halves 50a and 50b is steel, preferably free cutting carbon steel sold under the trade name FREMAX. It is preferably heat treated using a process known as MELONITE QPQ. The assembled cam 50 has an outer diameter of fifteen inches and a thickness of 1.13 inches. Groove 52 is 0.63 inches deep. Threaded apertures 53 receive threaded fasteners (not shown) for tie plates 56 to hold halves 50a and 50b together. Cam 50 could be made in three or more sections if necessary, or it may be made in one piece. Threaded apertures 57 receive threaded fasteners 62 holding sleeve 60 to cam 50.

Cam 50 has been specifically designed for the particular machine 100 to form two styles of cartons. A first circumferential portion from FL1 to FL2 of 175 degrees is used to perform the folding operation on full lock style cartons, and a second circumferential portion from SL1 to SL2 of 125 degrees is used to perform the folding operation on shoulder lock style cartons. Groove 52 receives a cam follower, which preferably is a roller bearing. Groove 52 has a constant width and varies radially on cam 50. Cam 50 rotates in the direction indicated by arrow A. For the first 95 degrees of rotation of cam 50 from FL1 or SL1 toward FL2 or SL2 respectively, groove 52 has the same contour: a 30 degree modified sine of decreasing radius followed by a 65 degree dwell of constant radius. For the shoulder lock carton, the subsequent section is a 30 degree modified sine of increasing radius to position SL2. For the full lock carton, the subsequent sections are a 30 degree synthesized modified sine-harmonic motion of decreasing radius followed by a 50 degree section of synthesized modified sine-harmonic motion of increasing radius to point FL2. A 15 degree dwell connects FL2 to SL1, and a 45 degree dwell connects SL2 to FL1.

Referring to FIGS. 7 9, 10A and 10B, cam 50 rotates a full 360 degrees for each carton processed on machine 100. Because the cam follower is always running in groove 52, the mechanisms driven by it will go through the entire sequence of motion for both the shoulder lock folding operation and the full lock operation during each revolution of cam 50. However a carton is only present at the forming station during a portion of the cycle. Because of the clocking of cam 50 on shaft 80, the mechanisms for forming the carton go through the proper sequence (shoulder lock SL1→SL2 or full-lock FL1→to FL2) when the carton is present and at the proper stage of being formed at the forming station. During the remainder of the cycle the carton is either entering or leaving the forming station, or in an early stage of forming so as not to be in a position to be acted upon by the mechanism going through is opposite sequence of motion. Thus, the forming mechanisms controlled by cam 50 only operate in the air when going through their opposite motion for the carton being processed.

A cam of the present invention may incorporate more than two operations on a single cam if motion from the "unused" operations does not interfere with other operations of the process for which the cam is used.

Figure 10A:
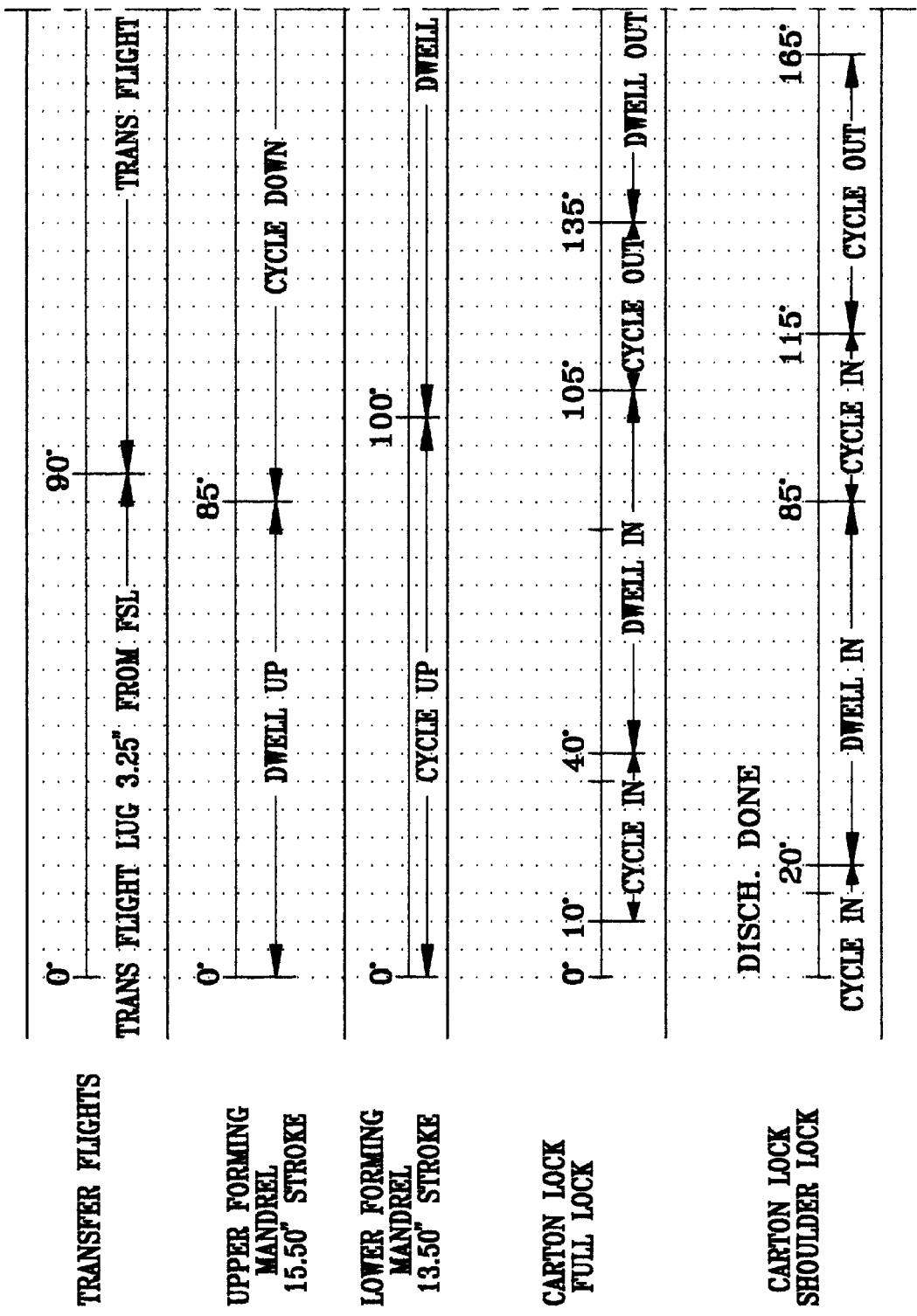
FIGS. 10A–10B are timing diagrams for the cam of FIG. 6 and other portions of the machine shown in FIG. 5.
Figure 10B:
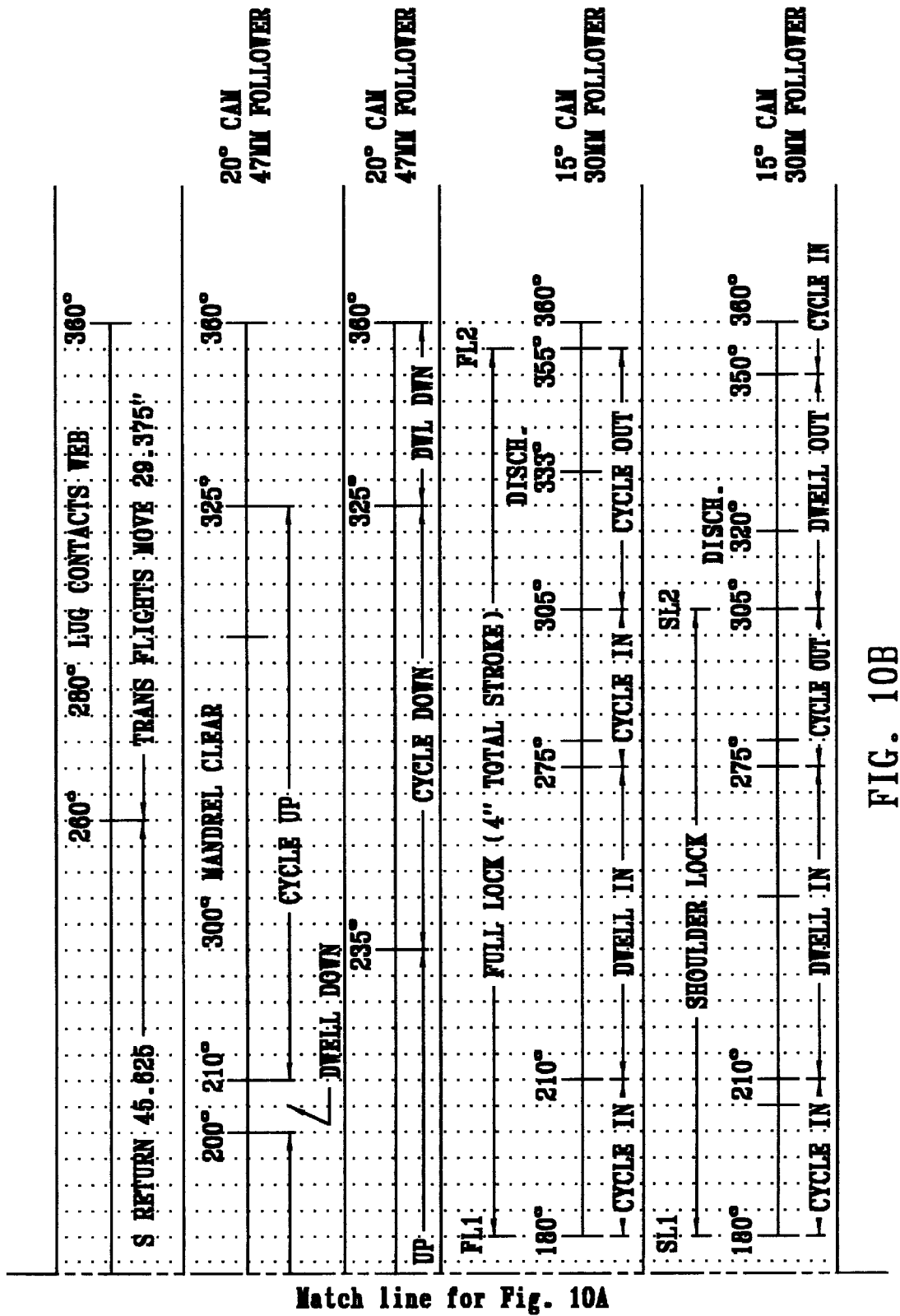

Referring to FIGS. 10A and 10B, timing diagrams are shown for cam 50 controlling the carton locks in conjunction with timing diagrams for motion of other mechanisms for forming and transferring the carton. Either the shoulder lock or the full lock will be used, and the timing diagrams for the carton lock are for the cam rotated into the proper position on the shaft. Position SL1 and position FL1 of FIG. 9 for the shoulder lock and full lock respectively correspond with the 180 degree mark on the timing diagrams.

The present invention has been described for a cam configuration that is a flat plate with a groove which receives a follower. The invention applies to other well known mechanical cam configurations as well such as a flat plate having a curvilinear or contoured outer edge on which a spring loaded follower rides, or such as a cylinder having a contoured end against which a follower tracks.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

What is claimed is:

1. A cam system, comprising:
    (a) a cam and a cam follower, said cam having a contour with at least two circumferential portions, a first circumferential portion adapted to cause a first motion sequence in said cam follower tracking said contour and a second circumferential portion adapted to cause a second motion sequence in said cam follower, said cam being a flat plate having a curvilinear shape and an axis of rotation, said cam having a first face, said contour being a groove in said first face which receives said cam follower, said groove forming a closed curve around and having a varying radius from said axis of rotation of said cam, said cam further having at least two access apertures through said plate and said groove;
    (b) a rotatable shaft, said shaft having an axis of rotation aligned with said axis of rotation of said cam; and
    (c) means for registering said cam on said shaft, said cam having at least two registered positions relative to said shaft, a first registered position corresponding to said first motion sequence and a second registered position corresponding to said second motion sequence, each of said at least two access apertures corresponding to one of said registered positions of said cam relative to said shaft.

2. The cam system of claim 1, wherein said plate is assembled from at least two sections.

3. The cam system of claim 2, wherein said sections are joined by a plurality of tie bars mechanically fastened to said sections.

4. The cam system of claim 1, further comprising a radially expandable locking device disposed coaxially with said shaft, said locking device being adapted for selectively holding said cam in fixed position relative to said shaft and allowing said cam to be rotated between said registered positions relative to said shaft.

5. The cam system of claim 4, further comprising a sleeve, a first hub and a second hub, all disposed coaxially with said shaft, said first hub being disposed radially against said expandable locking device, said cam being disposed axially from said first hub and said locking device, said second hub being disposed between said cam and said first hub, said first and said second hubs being clampable axially, said sleeve being disposed generally radially outward from said second hub, said sleeve being fixedly attached to said cam, said sleeve having a bore with a portion which receives said second hub in sliding engagement, said sleeve having an inwardly extending portion disposed between said first and said second hubs such that when said first and said second hubs are clamped axially said inwardly extending portion of said sleeve is clamped between them thereby fixedly connecting said first hub to said cam.

6. The cam system of claim 5, wherein said axial clamping of said first and second hubs is by a plurality of bolts.

7. The cam system of claim 5, wherein said means for registering said cam on said shaft includes a sleeve tab extending axially from said sleeve, and at least two hub tabs extending radially from said first hub, one of said hub tabs being for each of said registered positions of said cam relative to said shaft, said sleeve tab and said hub tabs being constructed and arranged to interfere with rotation of said sleeve relative to said first hub, and to locate one of said hub tabs adjacent said sleeve tab for each of said registered positions of said cam relative to said shaft.

8. The cam system of claim 7, further comprising a plurality of stop bolts, one each of said stop bolts being attached to each of said hub tabs so as to hit said sleeve tab when said hub tab is adjacent said sleeve tab, thereby providing means for adjusting said registered positions of said cam relative to said shaft.

9. The cam system of claim 1, wherein said cam is made of free cutting carbon steel.

10. A multi-functional cam system for controlling repetitive mechanical movement, comprising:
    (a) a rotatable shaft having an axis of rotation;
    (b) a cam and a cam follower, said cam having a curvilinear shape and an axis of rotation aligned with said axis of rotation of said shaft, said cam having a contour, said contour having a first portion adapted to cause a first motion sequence in said cam follower tracking said contour and a second portion adapted to cause a second motion sequence in said cam follower, said cam having at least two registered positions relative to said shaft, a first registered position corresponding to said first motion sequence and a second registered position corresponding to said second motion sequence;
    (c) a locking mechanism adapted for connecting said cam to said shaft, said locking mechanism including a radially expandable locking device, a sleeve, a first hub and a second hub, all disposed coaxially with said shaft, said expandable locking device being disposed radially between said first hub and said shaft, said locking device being adapted for selectively holding said cam in fixed position relative to said shaft and allowing said cam to be rotated between said registered positions relative to said shaft, said cam being disposed axially from said first hub and said expandable locking device, said second hub being disposed axially between said cam and said first hub, said first and said second hubs being clampable axially, said sleeve being disposed generally radially outward from said second hub, said sleeve being fixedly attached to said cam, said sleeve having a bore with a portion which receives said second hub in sliding engagement, said sleeve having an inwardly extending portion disposed between said first and said second hubs such that when said first and said second hubs are clamped axially said inwardly extending portion of said sleeve is clamped between them thereby fixedly connecting said first hub to said cam; and
    (d) a registration mechanism adapted for registering said cam on said shaft, said registration mechanism including a sleeve tab extending axially from said sleeve and including at least two hub tabs extending radially from said first hub, one of said hub tabs being for each of said registered positions of said cam relative to said shaft, said sleeve tab and said hub tabs being designed and arranged to interfere with rotation of said sleeve relative to said first hub and to locate one of said hub tabs adjacent said sleeve tab for each of said registered positions of said cam relative to said shaft.

11. A multi-functional cam system for controlling repetitive mechanical movement, comprising:
    (a) a cam and a cam follower, said cam being a flat plate assembled from at least two sections, said plate having an axis of rotation, a first face, and a groove in said first face which receives said cam follower, said groove forming a closed curve around said axis of rotation, said groove having a varying radius from said axis of rotation, said groove having a first circumferential portion adapted to cause a first motion sequence in said cam follower tracking within said groove and a second circumferential portion adapted to cause a second motion sequence in said cam follower, said cam having at least two registered positions relative to said shaft, a first registered position corresponding to said first motion sequence and a second registered position corresponding to said second motion sequence;
    (b) a rotatable shaft, said shaft having an axis of rotation aligned with said axis of rotation of said cam;
    (c) a locking mechanism adapted for connecting said cam to said shaft, said locking mechanism including a radially expandable locking device, a sleeve, a first hub and a second hub, all disposed coaxially with said shaft, said expandable locking device being disposed radially between said first hub and said shaft, said locking device being adapted for selectively holding said cam in fixed position relative to said shaft and allowing said cam to be rotated between said registered positions relative to said shaft, said cam being disposed axially from said first hub and said expandable locking device, said second hub being disposed axially between said cam and said first hub, said first and said second hubs being clampable axially, said sleeve being disposed generally radially outward from said second hub, said sleeve being fixedly attached to said cam, said sleeve having a bore with a portion which receives said second hub in sliding engagement, said sleeve having an inwardly extending portion disposed between said first and said second hubs such that when said first and said second hubs are clamped axially said inwardly extending portion of said sleeve is clamped between them thereby fixedly connecting said first hub to said cam; and
    (d) a registration mechanism adapted for registering said cam on said shaft, said registration mechanism including a sleeve tab extending axially from said sleeve and including at least two hub tabs extending radially from said first hub, one of said hub tabs being for each of said registered positions of said cam relative to said shaft, said sleeve tab and said hub tabs being designed and arranged to interfere with rotation of said sleeve relative to said first hub and to locate one of said hub tabs adjacent said sleeve tab for each of said registered positions of said cam relative to said shaft, each of said hub tabs having a stop bolt arranged so as to hit said sleeve tab when said hub tab is adjacent said sleeve tab, thereby providing means for adjusting said registered positions of said cam relative to said shaft.

* * * * *